(12) United States Patent
Brannon et al.

(10) Patent No.: US 7,726,399 B2
(45) Date of Patent: Jun. 1, 2010

(54) METHOD OF ENHANCING HYDRAULIC FRACTURING USING ULTRA LIGHTWEIGHT PROPPANTS

(75) Inventors: Harold Dean Brannon, Magnolia, TX (US); William Dale Wood, Spring, TX (US); Allan Ray Rickards, Tomball, TX (US); Christopher John Stephenson, Houston, TX (US)

(73) Assignee: BJ Services Company, Houston, TX (US)

( * ) Notice: Subject to any disclaimer, the term of this patent is extended or adjusted under 35 U.S.C. 154(b) by 313 days.

(21) Appl. No.: 10/954,398

(22) Filed: Sep. 30, 2004

(65) Prior Publication Data

US 2006/0065398 A1  Mar. 30, 2006

(51) Int. Cl.
*E21B 43/26* (2006.01)

(52) U.S. Cl. ............. 166/283; 166/281; 166/280.2; 166/308.1

(58) Field of Classification Search ............ 166/280.2, 166/308.1, 244.1, 280.1, FOR. 100, FOR. 101, 166/281, 283
See application file for complete search history.

(56) References Cited

U.S. PATENT DOCUMENTS

| | | | |
|---|---|---|---|
| 3,127,937 A | 4/1964 | McGuire et al. | |
| 3,151,678 A | 10/1964 | Hanson et al. | |
| 3,159,217 A | 12/1964 | Hanson | |
| 3,249,158 A * | 5/1966 | Kieschnick Jr et. al. | 166/292 |
| 3,335,797 A | 8/1967 | Braunlich | |
| 3,372,752 A | 3/1968 | Prater | |
| 3,399,727 A | 9/1968 | Graham et al. | |
| 3,497,008 A | 2/1970 | Graham et al. | |
| 3,954,142 A | 5/1976 | Broaddus et al. | |
| 4,078,609 A * | 3/1978 | Pavlich | 166/271 |
| RE30,484 E * | 1/1981 | Broaddus et al. | 166/307 |
| 4,283,089 A * | 8/1981 | Mazza et al. | 299/16 |
| 4,509,598 A | 4/1985 | Earl et al. | |
| 4,566,539 A * | 1/1986 | Perlman | 166/307 |
| 5,014,788 A | 5/1991 | Puri et al. | |
| 5,246,602 A * | 9/1993 | Forrest | 166/283 |
| 5,325,921 A * | 7/1994 | Johnson et al. | 166/280.1 |
| 5,381,864 A * | 1/1995 | Nguyen et al. | 166/280.1 |
| 5,390,741 A | 2/1995 | Payton et al. | |

(Continued)

FOREIGN PATENT DOCUMENTS

WO  WO 2004/083600 A1  9/2004

OTHER PUBLICATIONS

BJ Services Company, "LiteProp 125 Lightweight Proppant," Nov. 21, 2003, USA.

*Primary Examiner*—David J Bagnell
*Assistant Examiner*—David Andrews
(74) *Attorney, Agent, or Firm*—John Wilson Jones; Jones & Smith, LLP

(57) ABSTRACT

A subterranean formation having natural fractures, which is to be subjected to hydraulic fracturing, is first pre-treated with an ultra lightweight (ULW) proppant having an average particle size between from about 12/20 to about 40/70. The small ULW proppant flows into the natural fractures and packs the fractures. The formation is then subjected to hydraulic fracturing. The pre-treatment serves to enhance the effective propped fracture length of the formation during the hydraulic fracturing by reducing the loss of fluid from the subsequently pumped fracturing fluid. The method is applicable to hydrocarbon bearing formations as well as non-hydrocarbon bearing formations and has particular applicability to coal beds.

42 Claims, 6 Drawing Sheets

U.S. PATENT DOCUMENTS

| | | | |
|---|---|---|---|
| 5,417,286 A * | 5/1995 | Palmer et al. | 166/308.1 |
| 5,850,875 A | 12/1998 | McCulloch et al. | |
| 5,964,290 A | 10/1999 | Riese et al. | |
| 6,059,034 A | 5/2000 | Rickards et al. | |
| 6,330,916 B1 | 12/2001 | Rickards et al. | |
| 6,364,018 B1 | 4/2002 | Brannon et al. | |
| 6,412,559 B1 | 7/2002 | Gunter et al. | |
| 6,491,099 B1 | 12/2002 | Di Lullo Arias et al. | |
| 6,508,305 B1 | 1/2003 | Brannon et al. | |
| 6,749,025 B1 | 6/2004 | Brannon et al. | |
| 6,772,838 B2 | 8/2004 | Dawson et al. | |
| 7,044,220 B2 | 5/2006 | Nguyen et al. | |
| 7,207,386 B2 | 4/2007 | Brannon et al. | |
| 7,210,528 B1 | 5/2007 | Brannon et al. | |
| 7,213,651 B2 | 5/2007 | Brannon et al. | |
| 7,271,133 B2 | 9/2007 | Weaver et al. | |
| 2003/0234106 A1 * | 12/2003 | Surjaatmadja | 166/308 |
| 2004/0040708 A1 | 3/2004 | Stephenson et al. | |
| 2005/0016732 A1 | 1/2005 | Brannon et al. | |
| 2005/0028979 A1 | 2/2005 | Brannon et al. | |
| 2005/0059558 A1 | 3/2005 | Blauch et al. | |
| 2005/0130848 A1 | 6/2005 | Todd et al. | |
| 2005/0274523 A1 | 12/2005 | Wood et al. | |
| 2006/0011342 A1 * | 1/2006 | Lizak | 166/280.1 |
| 2006/0073980 A1 | 4/2006 | Brannon et al. | |
| 2006/0151169 A1 * | 7/2006 | Ortiz et al. | 166/280.2 |

* cited by examiner

METHOD OF ENHANCING HYDRAULIC FRACTURING USING ULTRA LIGHTWEIGHT PROPPANTS

FIELD OF THE INVENTION

This invention relates to a method of enhancing the hydraulic fracturing of subterranean formations having natural fractures by pre-treating the formation with an ultra lightweight (ULW) proppant. The method of the invention renders an increase in effective propped lengths.

BACKGROUND OF THE INVENTION

Hydraulic fracturing is a common stimulation technique used to enhance production of fluids from subterranean formations. This technique is commonly used to enhance the production of methane from coal bed wells.

In hydraulic fracturing, a fracturing fluid is pumped at high pressures and at high rates into a wellbore to initiate and propagate a hydraulic fracture. The fracturing fluid used to initiate and propagate the fracture is commonly known as the "pad". The pad may contain a fine particulate having a high apparent specific gravity, such as fine mesh sand, for fluid loss control, or larger grain sand to abrade perforations or near-wellbore tortuosity. Continued pumping extends the fractures.

Once the fracture is initiated, subsequent stages of viscosified fracturing fluid containing suspended proppant are pumped into the created fracture. The fracture generally continues to grow during pumping and the proppant remains in the fracture in the form of a permeable pack that serves to prop the fracture open. Once the treatment is completed, the fracture closes onto the proppant which maintains the fracture open, providing a highly conductive pathway for hydrocarbons and/or other formation fluids to flow into the wellbore.

Natural fractures in formations often create migratory channels for the fracturing fluid wherein the proppant, suspended in the fracturing fluid, settles out of the fluid. Well productivity is often compromised therefore since the pumpable job size is limited and leak-off to the natural fracture cannot be controlled. Previous attempts of introducing conventional proppant into natural fractures to seal off the fractures have used 40/70 or 100 mesh sands in slickwater-type fluids to control fluid loss. Such materials, however, display an excessive settling rate from the suspension.

Improvements in hydraulic fracturing techniques exhibiting minimal fluid loss to natural fractures are therefore desired. Such improvements, in turn, will render an increased effective propped fracture length in naturally fractured reservoirs, thereby improving stimulation efficiency and well productivity.

SUMMARY OF THE INVENTION

According to the present invention, a subterranean formation having natural fractures, which is to be subjected to hydraulic fracturing, is first pre-treated with a fluid or slurry containing at least one ultra lightweight (ULW) proppant. Such natural fractures interfere with hydraulic fracturing processes and the pre-treatment enhances the productivity in the formation. The formation is then subjected to hydraulic fracturing.

The method of the invention enhances the effective propped fracture length of the subterranean formation during the hydraulic fracturing by reducing the loss of fluid from the subsequently pumped fracturing fluid. The method of the invention is applicable to hydrocarbon bearing formations as well as non-hydrocarbon bearing formations. The invention has particular applicability to coal beds which has a series of natural fractures, or cleats. The method of the invention further has particular applicability to more conventional rock formations such as carbonate formations (like limestone, chalk and dolomite), sandstone or siliceous substrate minerals, such as quartz, clay, shale, silt, chert, zeolite, or a combination thereof.

The ULW proppant has an apparent specific gravity (ASG) less than or equal to 2.45, preferably less than about 1.75, most preferably less than 1.50. The average particle size of the ULW proppant is between from about 12/20 to about 40/70, preferably about 20/40, mesh. Such ULW proppants are capable of isolating the natural fracture since they will not settle as rapidly as higher density materials.

DETAILED DESCRIPTION OF THE PREFERRED EMBODIMENTS

The method of fracturing a subterranean formation having natural fractures, as defined by the invention, facilitates the generation of longer fracture lengths, than seen with conventional fracturing techniques, by the control of fluid loss to the natural fracture. Such longer effective primary propped fracture lengths translate to enhanced well stimulation efficiency and productivity.

The method consists of introducing a pad fluid containing a ultra lightweight (ULW) proppant into the formation at a rate and at a pressure sufficient to initiate a fracture. The ULW proppant has an apparent specific gravity (ASG) less than or equal to 2.45. Generally, the ASG of the ULW proppant is less than or equal to 2.25, more preferably less than or equal to 2.0, even more preferably less than or equal to 1.75, most preferably less than or equal to 1.25. Such proppants are less subject to settling and may be chipped, ground, crushed, or otherwise processed.

The particle size of the ULW proppant is such that the proppant is capable of flowing into the narrow natural fractures to pack the natural fractures and to avoid bridging of the particles at the intersection of the primary fracture with the natural fracture. The small size to avoid bridging must be counterbalanced by the size being large enough to provide a permeability contrast with the formation. Typically, the size distribution of the ULW proppants is such that the particulates can flow into the natural fractures. Typically, the particulates have a particle size range from about 12/20 to about 40/100 US mesh. As such, permeability of at least some of the natural fractures in the formation are reduced.

Figure 1:
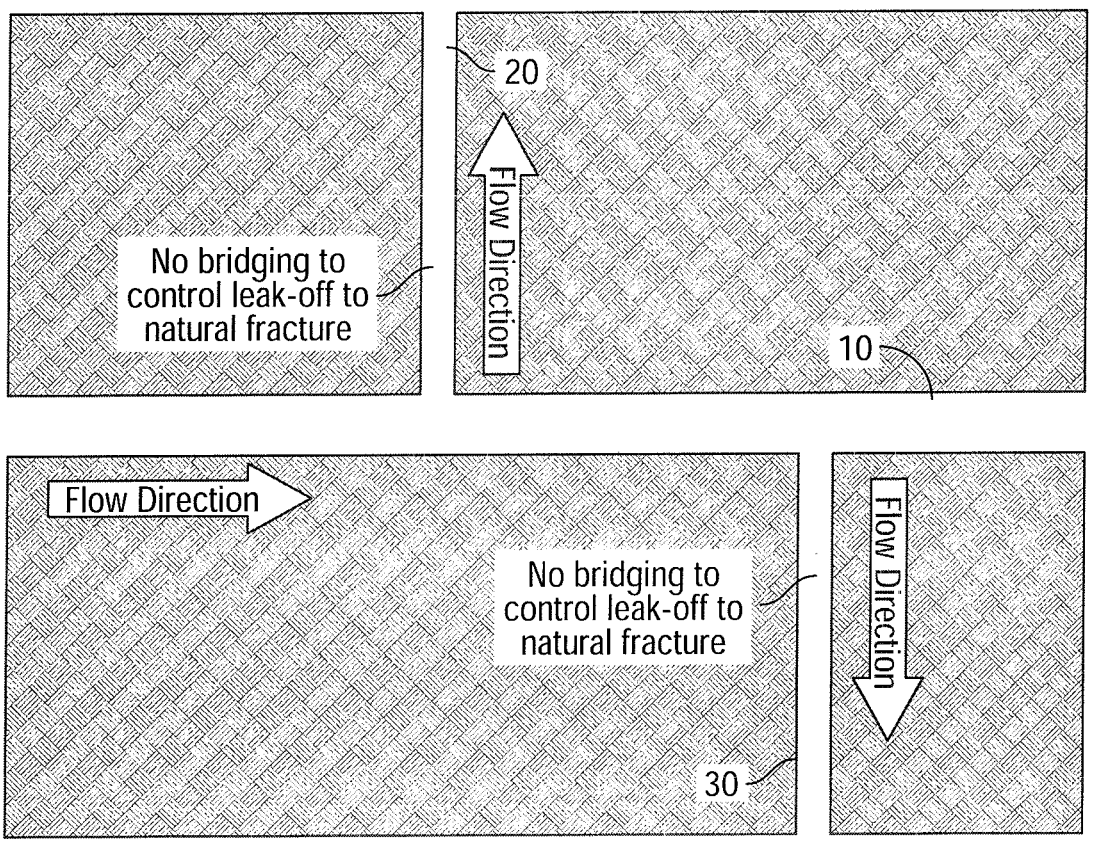
FIGS. 1, 2, 3, and 4 are overhead views of a vertical fracture directly above the main fracture plane. These figures schematically represent the formation of bridges in natural fractures, in accordance with the invention.

FIGS. 1, 2, 3, and 4 schematically illustrate a vertical fracture seen directly above the main fracture plane. Two natural fractures 20 and 30 lead from main fracture 10. The direction of flow through main fracture 10 and natural fractures 20 and 30 is illustrated. The pad fluid flows through each of the natural fractures. In FIG. 1, the pad fluid injected into the subterranean formation contains no solid material. Bridging to control leak-off to the natural fracture is not possible.

Figure 2:
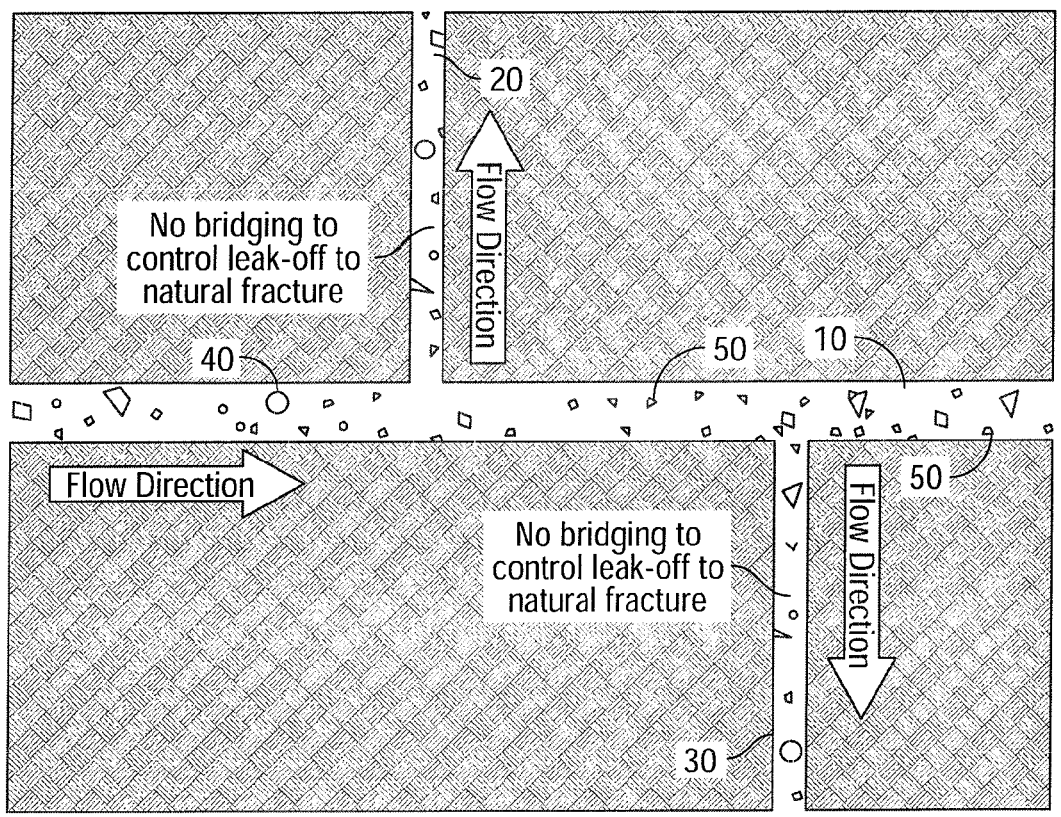
Figure 3:
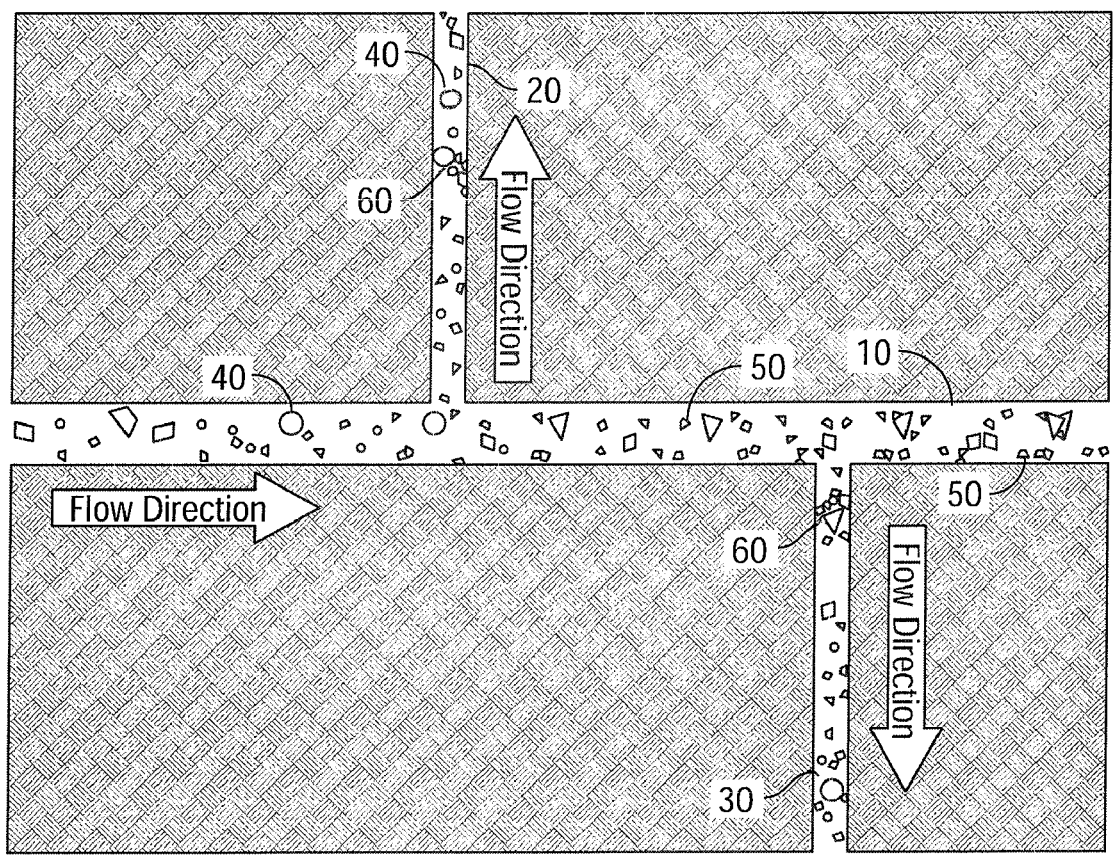
Figure 4:
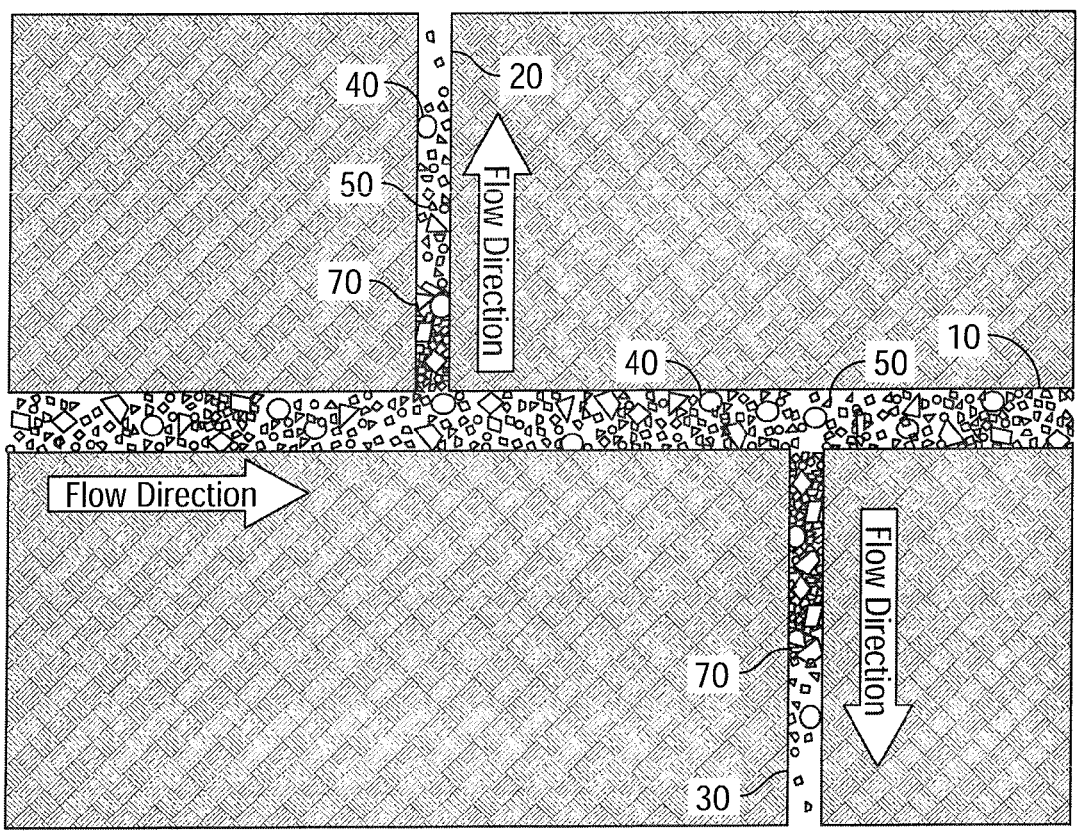

In FIGS. 2, 3 and 4, the flow stream contains a mixture of 20/40 ULW proppant 40 and 70/100 ULW proppant 50. As the particles move down main fracture 10, at least a portion of proppant 40 and proppant 50 is diverted down the course of natural fractures 20 and 30. As shown in FIG. 2, a pad fluid containing a small amount of proppant is insufficient to control leak-off. In FIG. 3, the pad fluid injected into the formation contains a sufficient amount of proppant so as to initiate bridging in natural fractures 20 and 30. Bridging, beginning in the natural fractures at 60, starts to control leak-off to the natural fractures. The bridging occurs as the fracture restricts and the particles agglomerate. Such bridges stop the remainder of the particles behind them from moving further into the natural fracture. As the particles stockpile, they impede the fluid flow into natural fractures 20 and 30 as well. As fluid flows into the natural fractures declines, main fracture 10 widens, making it easier to place a larger fracture treatment design than could have been place with uncontrolled natural fracture leak-off. In FIG. 4, the pad fluid injected into the formation contains a larger amount of proppant; the continuation of bridging occurs in the packing of the fracture (at 70), thereby diverting fluid back into main fracture 10.

In light of their low density, the ULW proppants, when introduced into the natural fractures as a component of the pad fluid, tend not to settle from the carrier fluid. As such, the ULW proppants remain in the natural fracture, thereby reducing the flow of fluids to such natural fractures, and thereby controlling the loss of fluid. Since a higher resistance to pressure is created in the natural fracture by the use of the pad containing the ULW proppant, less fluid from the subsequently introduced fracturing fluid is channeled into the natural fracture. In addition, the packed natural fracture exhibits some conductivity to produced fluids flowing back through the created fracture.

Typically, the concentration of the ULW proppant in the pad fluid is between from about 1 to about 18 pounds per gallon of pad fluid, but higher or lower concentrations can be used as required.

Suitable ULW proppants are those disclosed in U.S. Pat. Nos. 6,364,018; 6,330,916; and 6,749,025, all of which are herein incorporated by reference. Examples of types of materials include, but are not limited to, ground or crushed shells of nuts such as walnut, pecan, almond, ivory nut, brazil nut, etc.; ground or crushed seed shells (including fruit pits) of seeds of fruits such as plum, peach, cherry, apricot, etc.; ground or crushed seed shells of other plants such as maize (e.g. corn cobs or corn kernels), etc., crushed fruit pits or processed wood materials such as those derived from woods such as oak, hickory, walnut, poplar, mahogany, etc. including such woods that have been processed by grinding, chipping, or other form of particleization. Such materials may be coated with a resin to substantially protect and waterproof the shell. For instance a suitable ULW proppant consists of ground or crushed walnut shells coated with a resin; such proppants exhibit an ASG of from about 1.25 to about 1.35.

Further, the ULW proppant for use in the invention may be a core component at least partially surrounded by a protective or hardening coating, such as the selectively configured porous particulates (as well as the non-selectively configured porous particulates) set forth in U.S. Patent Publication No. 2004/0040708, published on Mar. 4, 2004, herein incorporated by reference. Such ULW proppants include porous particulates which have been treated with a non-porous penetrating, coating and/or glazing material.

Further, the ULW proppants may be a well treating aggregate composed of at least one organic lightweight material and a weight modifying agent. The ASG of the organic lightweight material is either greater than or less than the ASG of the well treating aggregate depending on if the weight modifying agent is a weighting agent or weight reducing agent, respectively. The weight modifying agent may be a weighting agent having a higher ASG than the organic lightweight material. The presence of the weighting agent renders a well treating aggregate having a ASG greater than the ASG of the organic lightweight material. Alternatively, the weight modifying agent may be a weight reducing agent having a lower ASG than the organic lightweight material. The presence of the weight reducing agent renders a well treating aggregate having a ASG less than the ASG of the organic lightweight material.

The aggregates are comprised of a continuous phase composed of the organic lightweight material and a discontinuous phase composed of a weight modifying material. The volume ratio of resin (continuous phase) to weight modifying agent (discontinuous phase) is approximately 75:25. The aggregate particle diameter is approximately 850 microns. The average diameter of the weight modifying agent particulates is approximately 50 microns. The compressive strength of the aggregate is greater than the compressive strength of the organic lightweight material. When hardened, the aggregate exhibits a strength or hardness to prevent deformation at temperatures and/or formation closure stresses where substantially deformable materials generally become plastic and soften.

In a preferred embodiment, the weight modifying agent is selected so as to modify or customize the ASG of the aggregate in order to impart to the aggregate the desired ASG. For example, the organic lightweight material may be treated with a weight modifying agent in such a way that the aggregate has a ASG close to the ASG of the carrier fluid so that it is neutrally buoyant or semi-buoyant in a fracturing fluid or sand control fluid. Alternatively, the weight modifying material may be selected so that the aggregate has the structural support and strength to withstand the closure stresses of a hydraulic fractured formation, or other downhole stresses. The amount of weight modifying agent in the well treating aggregate is such as to impart to the well treating aggregate the desired ASG. Typically, the amount of weight modifying agent in the well treating aggregate is between from about 15 to about 85 percent by volume of the well treating aggregate, most preferably approximately about 52 percent by volume. The particle sizes of the weight modifying agent are preferably between from about 10 to about 200 microns.

The organic lightweight material is preferably a polymeric material, such as a thermosetting resin, including polystyrene, a styrene-divinylbenzene copolymer, a polyacrylate, a polyalkylacrylate, a polyacrylate ester, a polyalkyl acrylate ester, a modified starch, a polyepoxide, a polyurethane, a polyisocyanate, a phenol formaldehyde resin, a furan resin, or a melamine formaldehyde resin. The ASG of the organic lightweight material generally less than or equal to 1.1. In a preferred embodiment, the ASG of the material is between about 0.7 to about 0.8.

The amount of organic lightweight material in the aggregate is generally between from about 10 to about 90 percent by volume. The volume ratio of organic lightweight material: weight modifying agent in the aggregate is generally between from about 20:80 to about 85:15, most preferably about 25:75. As an example, using an organic lightweight material having an ASG of 0.7 and a weight modifying agent, such as silica, having an ASG of 2.7, a 20:80 volume ratio would render an aggregate ASG of 2.20 and a 85:15 volume ratio would render an ASG of 1.0; a 75:25 volume ratio would render an ASG of 1.20. In a preferred mode, the ASG of the well treating aggregate is at least about 0.35. In a most preferred mode, the ASG of the well treating aggregate is at least about 0.70, more preferably 1.0, but not greater than about 2.0.

The weight modifying agent may be sand, glass, hematite, silica, sand, fly ash, aluminosilicate, and an alkali metal salt or trimanganese tetraoxide. In a preferred embodiment, the weight modifying agent is selected from finely ground sand, glass powder, glass spheres, glass beads, glass bubbles, ground glass, borosilicate glass or fiberglass. Further, the weight modifying agent may be a cation selected from alkali metal, alkaline earth metal, ammonium, manganese, and zinc and an anion selected from a halide, oxide, a carbonate, nitrate, sulfate, acetate and formate. For instance, the weight modifying agent may include calcium carbonate, potassium chloride, sodium chloride, sodium bromide, calcium chloride, barium sulfate, calcium bromide, zinc bromide, zinc formate, zinc oxide or a mixture thereof. Glass bubbles and fly ash are the preferred components for the weight reducing agent.

The aggregates are generally prepared by blending the organic lightweight material with weight modifying agent for a sufficient time in order to form a slurry or a mud which is then formed into sized particles. Such particles are then hardened by curing at temperatures ranging from about room temperature to about 200° C., preferably from about 50° C. to about 150° C. until the weight modifying agent hardens around the organic lightweight material. In a preferred mode, the organic lightweight material forms a continuous phase; the weight modifying forming a discontinuous phase.

The ASG of the well treating aggregate is generally less than or equal to 2.0, preferably less than or equal to 1.5, to meet the pumping and/or downhole formation conditions of a particular application, such as hydraulic fracturing treatment, sand control treatment. Further, the aggregates exhibit a Young's modulus of between about 500 psi and about 2,000,000 psi at formation conditions, more typically between about 5,000 psi and about 500,000 psi, more typically between about 5,000 psi and 200,000 psi at formation conditions, and most typically between about 7,000 and 150,000 psi at formation conditions. The Young's modulus of the aggregate is substantially higher than the Young's modulus of the organic lightweight material or the weighting agent.

The pad fluid is a homogeneous fluid or a slurry containing the ULW proppant. Any carrier fluid suitable for transporting the ULW proppant into a well and/or subterranean formation fracture in communication therewith may be employed including, but not limited to, carrier fluids including a completion or workover brine, salt water, fresh water, potassium chloride solution, a saturated sodium chloride solution, liquid hydrocarbons, and/or nitrogen, carbon dioxide or other gases.

Suitable carrier fluids include or may be used in combination with fluids have gelling agents, cross-linking agents, gel breakers, surfactants, foaming agents, demulsifiers, buffers, clay stabilizers, acids, or mixtures thereof.

Suitable ULW proppants include those which are substantially neutrally buoyant. By "substantially neutrally buoyant," it is meant a material having an ASG sufficiently close to the ASG of an ungelled or weakly gelled carrier fluid (e.g., ungelled or weakly gelled completion brine, other aqueous-based fluid, or other suitable fluid) to allow pumping and satisfactory placement of the ULW proppant using the selected carrier fluid. For example, urethane resin-coated ground walnut hulls having an ASG of from about 1.25 to about 1.35 may be employed as a substantially neutrally buoyant proppant in completion brine having an ASG of about 1.2. It will be understood that these values are exemplary only. As used herein, a "weakly gelled" carrier fluid is a carrier fluid having minimum sufficient polymer, viscosifier or friction reducer to achieve friction reduction when pumped down hole (e.g., when pumped down tubing, work string, casing, coiled tubing, drill pipe, etc.), and/or may be characterized as having a polymer or viscosifier concentration of from greater than 0 pounds of polymer per thousand gallons of base fluid to about 10 pounds of polymer per thousand gallons of base fluid, and/or as having a viscosity of from about 1 to about 10 centipoises. An ungelled carrier fluid may be characterized as containing about 0 pounds per thousand gallons of polymer per thousand gallons of base fluid.

Subsequent to the pre-treatment of the formation with the pad fluid, the formation is then subjected to hydraulic fracturing. Methods of hydraulic fracturing are well known in the art. Conventional proppants used in hydraulic fracturing may be employed including any of the ULW proppants and/or carrier fluids set forth in the paragraphs above.

Such conventional hydraulic fracturing proppants include quartz, glass, aluminum pellets, silica (sand) (such as Ottawa, Brady or Colorado Sands), synthetic organic particles such as nylon pellets, ceramics (including aluminosilicates such as "CARBOLITE," "NAPLITE" or "ECONOPROP"), sintered bauxite, and mixtures thereof. In addition, protective and/or hardening coatings, such as resins to modify or customize the apparent specific gravity of a selected base proppant, e.g., ground walnut hulls, etc., resin-coated sand (such as "ACME BORDEN PR 6000" or "SANTROL TEMPERED HS"), resin-coated ceramic particles and resin-coated sintered bauxite may be employed. Such proppants typically exhibit an apparent specific gravity, for instance greater than 2.65.

The formation subjected to the treatment of the invention may be a hydrocarbon or a non-hydrocarbon subterranean formation.

The invention has particular applicability to coal beds which has a series of natural fractures, or cleats, for the recovery of natural gases, such as methane, and/or sequestering a fluid which is more strongly adsorbing than methane, such as carbon dioxide and/or hydrogen sulfide.

The invention has further particular applicability to the stimulation of carbonate formations, such as limestone, chalk or dolomite as well as subterranean sandstone or siliceous formations in oil and gas wells, including quartz, clay, shale, silt, chert, zeolite, or a combination thereof.

The following examples will illustrate the permeability that remains in the natural fractures after the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

Example 1

Conductivity tests were performed according to a modified API RP 61 (1$^{st}$ Revision, Oct. 1, 1989) using an API conductivity cell. Conductivity tests demonstrate the permeability contrast that remains in the natural fractures as a result of this invention. The proppant sample was loaded into the cell between Ohio sandstone wafers and closure stress applied to the proppant using a DAKE hydraulic press having a ROSEMOUNT differential transducer (#3051C) and controlled by a CAMILE controller. Also employed in the testing was a CONSTAMETRIC 3200 constant rate pump which was used to flow deionized water through each particulate sample.

The proppant was LiteProp™ 125, a lightweight proppant comprising ground nut shells coated with protective or hardening coating and having a size of about 45/65 mesh, available from BJ Services Company. Experimental parameters for the LiteProp™ 125 evaluation are shown in Tables I-III below:

TABLE I

| | | | |
|---|---|---|---|
| Cell # | 013 | Top | |
| Width Core Top (cm) | 8.940 | Fluid | 0 mls |
| Width Core Bottom (cm) | 10.160 | Proppant | 31.5 grams |
| Width Pack, initial (cm) | 0.237 | | |

TABLE II

| | | | |
|---|---|---|---|
| Temperature (° F.) | 150 | | |
| Closure Pressure (psi) | 1000-5000 | Concentration | 1 lbs/ft$^2$ |
| Fluid Pressure (psi) | 500 | Baseline | 50 Darcies |

TABLE III

| Test Data Time | Temp (° F.) | Temp (° C.) | Rate (mls/min) | Viscosity (cp) | Diff. in Pressure (DP) | Width (inches) | Conductivity (md-ft) | Permeability (Darcies) | Closure Stress (psi) |
|---|---|---|---|---|---|---|---|---|---|
| 0 | 125.89 | 52.16 | 3.00 | 0.53 | 0.048 | 0.222 | 878 | 47 | 1,009 |
| 10 | 150.81 | 66.00 | 3.05 | 0.43 | 0.047 | 0.222 | 751 | 41 | 1,031 |
| 20 | 150/82 | 66.01 | 3.40 | 0.43 | 0.048 | 0.222 | 817 | 44 | 1,044 |
| 0 | 150.79 | 65.99 | 3.77 | 0.43 | 0.071 | 0.188 | 611 | 39 | 1,994 |
| 10 | 150.80 | 66.00 | 3.87 | 0.43 | 0.073 | 0.188 | 603 | 39 | 1,997 |
| 20 | 150.81 | 66.00 | 4.50 | 0.43 | 0.076 | 0.188 | 677 | 43 | 1,984 |
| 30 | 150.80 | 66.00 | 4.29 | 0.43 | 0.078 | 0.188 | 631 | 40 | 1,983 |
| 0 | 150.86 | 66.04 | 0.92 | 0.43 | 0.025 | 0.175 | 417 | 29 | 3,986 |
| 10 | 150.77 | 65.98 | 3.79 | 0.41 | 0.178 | 0.175 | 234 | 16 | 4,000 |
| 0 | 150.81 | 66.00 | 3.71 | 0.43 | 0.263 | 0.165 | 161 | 12 | 5,007 |

As may be seen from the results of this example, introduction of a ULW proppant in a slickwater, low viscosity gel, or a brine achieves the requisite fracture conductivity.

Example 2

The procedure of Example 1 was repeated to illustrate diverting in the natural fracture, except a slot flow was used in place of the normal flow in order to make the core available. A 7 cP initial or baseline slurry of 2 weight % KCl slickwater containing 10 lbs. of guar was put into a piston accumulator and was then injected into the cell. The initial fracture permeability averaged 12.8 Darcies at an average rate of 27.3 ml/min. See Table IV.

A diverting stage consisting of the baseline slurry and 1 lb. of the 40/55 mesh LiteProp™ 125 was then injected at an average rate of 52.9 ml/min. Flow was diverted in the fracture as illustrated by the differential in pressure, DP. At 315 DP (the highest recordation point for the equipment), the fracture was completely shut off.

Lastly, a third pump was employed using the baseline slurry at an average rate of 16.8 ml/min. The fracture permeability averaged 6.7 Darcies.

Figure 5:
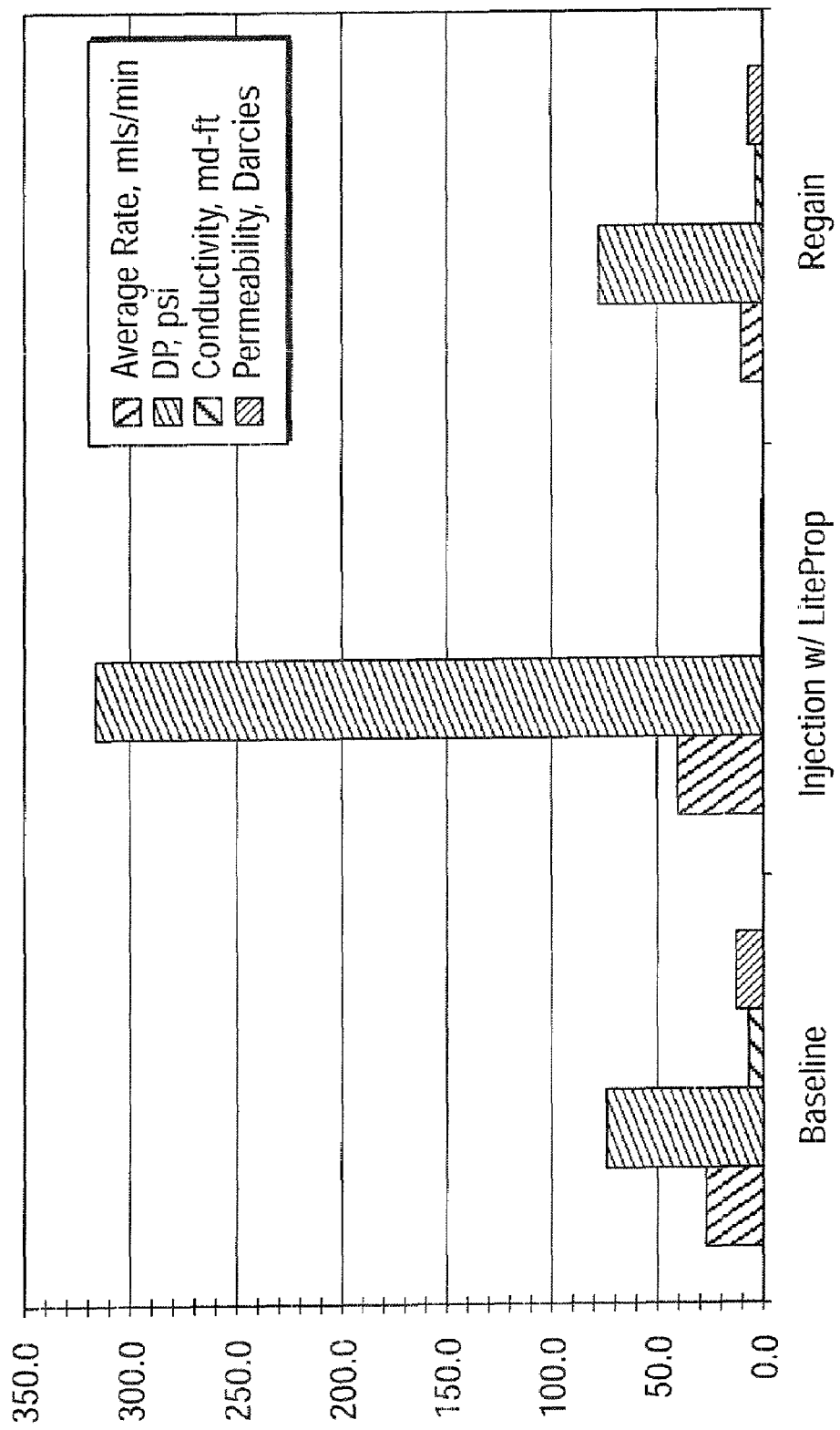
FIG. 5 is a bar graph illustrating the effect of a diverting stage containing LiteProp™ 125 on a natural fracture.
Figure 6:
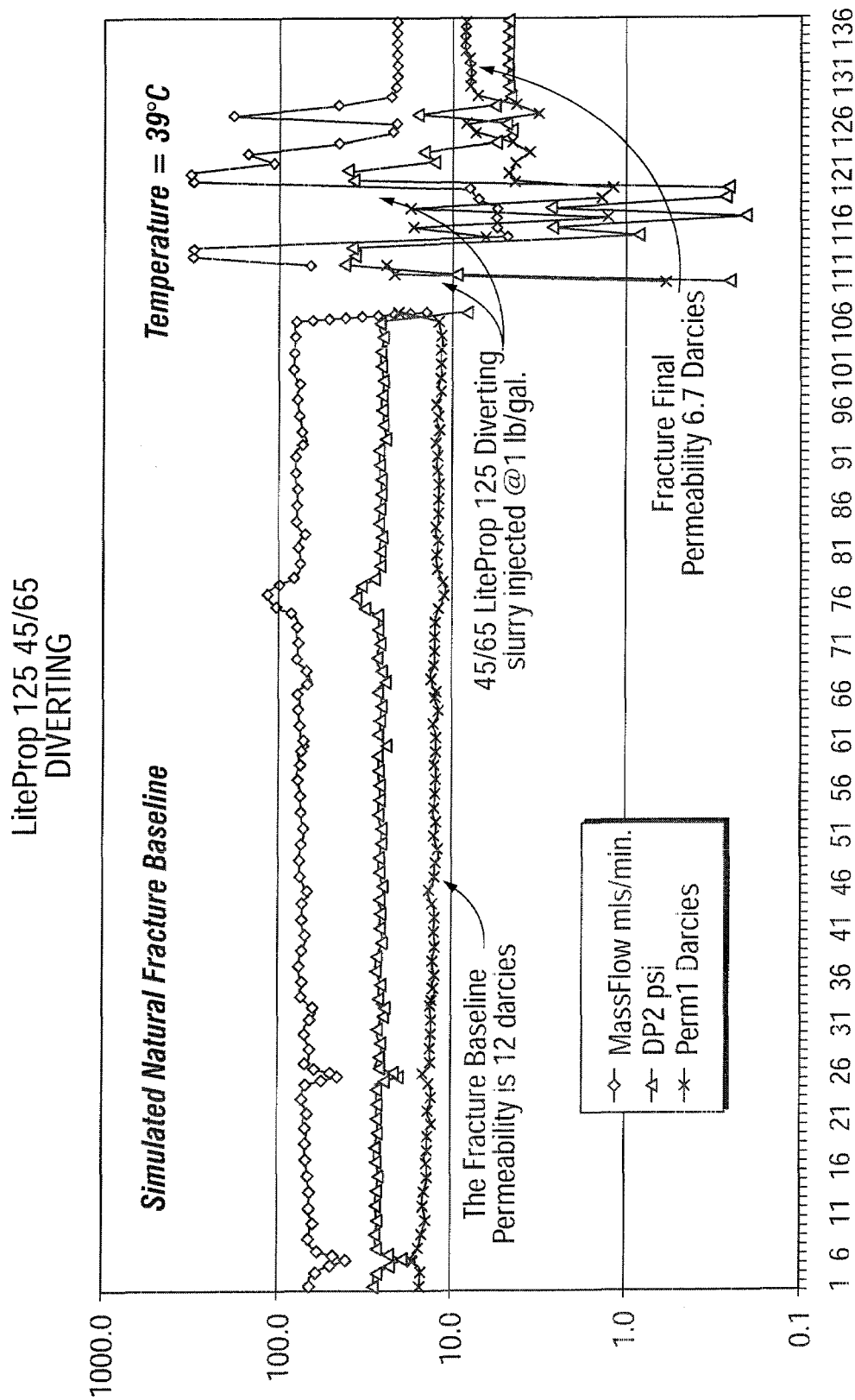
FIG. 6 is a graph illustrating the effect of a diverting stage containing LiteProp 125™ on a natural fracture.

Table V is a compilation of readings taken at selected intervals. The readings are diagrammed in FIG. 5 on a Cartesian scale and are graphically displayed in FIG. 6 on a logarithmic scale.

TABLE IV

| | Average Rate ml/min | DP psi | Conductivity md-ft | Permeability Darcies |
|---|---|---|---|---|
| Baseline | 27.3 | 74.3 | 7.1 | 12.8 |
| Injection with LiteProp ™ 125 | 52.9 | 315.99 | 0.1 | 0.2 |
| Regain | 16.8 | 65.6 | 3.6 | 6.7 |

TABLE V

| Elapsed Time minutes | Temp °C. | MassFlow ml/min | DP2 Psi | FractureWidth Inches | Visc1 Cps | Conductivity md-ft | Perm 1 Darcies |
|---|---|---|---|---|---|---|---|
| 15 | 34.8 | 26.5 | 62.830 | 0.007 | 0.722 | 8 | 14 |
| 15 | 34.8 | 28.5 | 66.844 | 0.007 | 0.722 | 8 | 15 |
| 29 | 35.1 | 28.7 | 77.188 | 0.007 | 0.71797 | 7 | 13 |
| 29 | 34.9 | 27.6 | 74.801 | 0.007 | 0.72085 | 7 | 13 |
| 44 | 35.1 | 28.2 | 79.576 | 0.007 | 0.71797 | 7 | 12 |
| 44 | 34.9 | 24.0 | 64.456 | 0.007 | 0.72085 | 7 | 13 |
| 58 | 34.9 | 25.2 | 74.801 | 0.007 | 0.72085 | 6 | 12 |
| 58 | 35.1 | 26.3 | 74.801 | 0.007 | 0.71797 | 7 | 12 |
| 72 | 35.5 | 0.0 | 0.000 | 0.007 | 0.71228 | 0 | 0 |
| 72 | 35.4 | 0.3 | 0.000 | 0.007 | 0.7137 | 0 | 1 |
| 75 | 35.4 | 9.5 | 0.000 | 0.006 | 0.7137 | 12 | 22 |
| 90 | 35.1 | 61.3 | 1.572 | 0.006 | 0.71797 | 749 | 1412 |
| 93 | 35.1 | 53.0 | 7.958 | 0.006 | 0.71797 | 128 | 241 |
| 93 | 35.1 | 44.3 | 66.844 | 0.006 | 0.71797 | 13 | 24 |
| 94 | 35.1 | 38.9 | 315.119 | 0.006 | 0.71797 | 2 | 4 |
| 94 | 35.1 | 39.4 | 315.119 | 0.006 | 0.71797 | 2 | 5 |
| 95 | 35.1 | 0.9 | 4.775 | 0.006 | 0.71797 | 4 | 7 |
| 95 | 35.0 | 6.6 | 5.570 | 0.006 | 0.71941 | 23 | 43 |
| 101 | 35.0 | 0.0 | 7.162 | 0.006 | 0.71941 | 0 | 0 |
| 101 | 35.1 | 0.0 | 7.162 | 0.006 | 0.71797 | 0 | 0 |
| 113 | 34.8 | 44.2 | 7.958 | 0.007 | 0.72229 | 108 | 196 |
| 113 | 34.9 | 54.7 | 7.958 | 0.007 | 0.72085 | 133 | 242 |
| 114 | 34.9 | 48.5 | 7.958 | 0.006 | 0.72085 | 118 | 222 |
| 114 | 34.8 | 39.0 | 315.119 | 0.006 | 0.72229 | 2 | 4 |
| 115 | 34.8 | 42.5 | 315.119 | 0.007 | 0.72229 | 3 | 5 |
| 115 | 34.9 | 12.9 | 108.223 | 0.006 | 0.72085 | 2 | 4 |
| 116 | 34.9 | 15.1 | 153.581 | 0.006 | 0.72085 | 2 | 4 |
| 116 | 34.9 | 5.8 | 46.950 | 0.006 | 0.72085 | 2 | 4 |
| 117 | 34.9 | 4.6 | 23.077 | 0.006 | 0.72085 | 4 | 7 |
| 117 | 34.9 | 5.0 | 21.485 | 0.006 | 0.72085 | 4 | 8 |
| 118 | 34.9 | 16.2 | 187.003 | 0.006 | 0.72085 | 2 | 3 |
| 118 | 34.9 | 5.8 | 46.950 | 0.007 | 0.72085 | 2 | 4 |
| 119 | 34.9 | 4.6 | 23.077 | 0.006 | 0.72085 | 4 | 7 |
| 122 | 34.8 | 5.0 | 21.485 | 0.006 | 0.72229 | 4 | 8 |
| 122 | 34.9 | 5.0 | 21.485 | 0.006 | 0.72085 | 4 | 8 |
| 123 | 34.9 | 5.0 | 21.485 | 0.006 | 0.72085 | 4 | 8 |

At 29 minutes, the fracture is capable of easily accepting fluids, evidenced by the permeability of 13 Darcies. At 72 minutes, the diverting stage was injected and the baseline slurry was re-introduced at 114 minutes. The data illustrates the resistance to flow through a packed natural fracture. Re-introduction of the baseline slurry in the production direction simulates the stimulation achieved by propping the natural fracture open with the conductive pack.

The foregoing disclosure and description of the invention are illustrative and explanatory thereof, and various changes in the size, shape, and materials, as well as in the details of illustrative construction and assembly, may be made without departing from the spirit of the invention.

What is claimed is:

1. A method for enhancing the productivity of a formation having natural fractures comprising:
    creating a fracture in the formation by pumping into the formation, at a rate and pressure sufficient to initiate the fracture, a pad fluid or slurry containing an ultra lightweight (ULW) proppant, the ULW proppant having an apparent specific gravity less than or equal to 2.45 and an average particle size between from about 12/20 to about 40/100 mesh, wherein the ULW proppant has a tendency not to settle from the fluid or slurry upon introduction of the fluid or slurry into at least some of the natural fractures in the formation;
    bridging the ULW proppant in at least some of the natural fractures; and
    pumping a fracturing fluid containing a proppant into the formation, wherein the flow of the fracturing fluid to at least some of the natural fractures is impeded by the bridged ULW proppant in the natural fractures and wherein the created fracture is extended by the impeded fracturing fluid within the created fracture and further wherein such natural fractures exhibit conductivity to produced fluids.

2. The method of claim 1, wherein the apparent specific gravity of the ULW proppant is less than or equal to 2.25.

3. The method of claim 2, wherein the apparent specific gravity of the ULW proppant is less than or equal to 2.0.

4. The method of claim 3, wherein the apparent specific gravity of the ULW proppant is less than or equal to 1.75.

5. The method of claim 4, wherein the apparent specific gravity of the ULW proppant is less than or equal to 1.25.

6. The method of claim 1, wherein the average particulate size of the ULW proppant is about 20/40.

7. The method of claim 1, wherein the ULW proppant comprises a core component at least partially surrounded by a protective or hardening coating.

8. The method of claim 1, wherein the ULW proppant is suspended in a carrier fluid.

9. The method of claim 1, wherein the formation is a hydrocarbon-bearing formation.

10. The method of claim 9, wherein the hydrocarbon-bearing formation is a coal bed.

11. The method of claim 9, wherein the hydrocarbon-bearing formation is a carbonate formation, sandstone or a siliceous substrate mineral.

12. The method of claim 11, wherein the hydrocarbon-bearing formation is quartz, clay, shale, silt, chert, zeolite, limestone, chalk or dolomite.

13. The method of claim 1, wherein, subsequent to hydraulic fracturing, conductivity of the natural fractures is increased.

14. The method of claim 1, wherein the effective propped length of the created fracture is greater than the effective propped length which would be created in an identical method which does not control leak-off by bridging ULW proppant in at least some of the natural fractures.

15. The method of claim 1, wherein the proppant in the fracturing fluid is a ULW proppant.

16. A method of hydraulically fracturing a subterranean formation having natural fractures, comprising:
    injecting into the formation a pad fluid containing a substantially neutrally buoyant ultra lightweight (ULW) proppant having an apparent specific gravity less than or equal to 2.45 and an average particle size between from about 12/20 to about 40/70 mesh, wherein the amount of ULW proppant in the pad fluid is an amount sufficient to initiate bridging of the ULW proppant in at least some of the natural fractures in the formation, thereby reducing the permeability of such natural fractures; and
    further subjecting the formation to hydraulic fracturing by introducing into the formation a fracturing fluid containing a proppant, wherein the flow of the fracturing fluid into the natural fractures is impeded by the bridging of the ULW proppant in the pad fluid.

17. The method of claim 16, wherein the apparent specific gravity of the ULW proppant is less than or equal to 2.25.

18. The method of claim 17, wherein the apparent specific gravity of the ULW proppant is less than or equal to 2.0.

19. The method of claim 18, wherein the apparent specific gravity of the ULW proppant is less than or equal to 1.75.

20. The method of claim 19, wherein the apparent specific gravity of the ULW proppant is less than or equal to 1.25.

21. The method of claim 16, wherein the average particle size of the ULW proppant is about 20/40.

22. The method of claim 16, wherein the ULW proppant is suspended in a carrier fluid.

23. The method of claim 16, wherein the formation is a hydrocarbon-bearing formation.

24. The method of claim 23, wherein the hydrocarbon-bearing formation is a coal bed.

25. The method of claim 23, wherein the hydrocarbon-bearing formation is a carbonate formation, sandstone or a siliceous substrate mineral.

26. The method of claim 16, wherein the formation is subjected to hydraulic fracturing by introduction of a fracturing fluid to the formation and further wherein the amount of fluid from the fracturing fluid which is channeled into the natural fracture is decreased due to the pumping into the formation of the fluid or slurry containing the ULW proppant.

27. The method of claim 16, wherein, subsequent to hydraulic fracturing, conductivity of the natural fractures is increased.

28. The method of claim 16, wherein the proppant in the fracturing fluid is a ULW proppant.

29. A method of enhancing the fracture length during hydraulic fracturing of a coal bed having cleats, comprising creating a fracture in the coal bed by injecting into the coal bed a fluid comprising an ultra lightweight (ULW) proppant having an apparent specific gravity less than or equal to 2.45 and an average particle size between from about 12/20 to about 40/70 mesh, bridging at least some particulates of ULW proppant in at least some of the cleats and thereby reducing the permeability of at least some of the cleats in the coal bed; and subjecting the coal bed to hydraulic fracturing by pumping a fracturing fluid into the formation wherein the flow of the fracturing fluid to at least some of the cleats is reduced by the bridged ULW proppant thereby extending the length of the fracture created in the formation.

30. The method of claim 29, wherein the apparent specific gravity of the ULW proppant is less than or equal to 2.25.

31. The method of claim 30, wherein the apparent specific gravity of the ULW proppant is less than or equal to 2.0.

32. The method of claim 31, wherein the apparent specific gravity of the ULW proppant is less than or equal to 1.75.

33. The method of claim 32, wherein the apparent specific gravity of the ULW proppant is less than or equal to 1.25.

34. A method of producing fluids from a subterranean formation having natural fractures comprising:
    controlling leak-off to at least some of the natural fractures by introducing into the formation a pad fluid comprising an ultra lightweight (ULW) proppant having an apparent specific gravity less than or equal to 2.45 and an average particle size between from about 12/20 to about 40/100 mesh, wherein the ULW proppant initiates a fracture in the formation and agglomerating the ULW proppant in the natural fractures such that bridging of the ULW proppant occurs in such natural fractures;
    subjecting the formation to hydraulic fracturing by introducing into the formation a fracturing fluid containing a proppant, wherein the flow of the fracturing fluid into the natural fractures is impeded by the bridging of the ULW proppant in the pad fluid and further wherein the bridged natural fractures exhibit conductivity to produced fluids during the hydraulic fracturing.

35. The method of claim 34, wherein the apparent specific gravity of the ULW proppant is less than or equal to 2.25.

36. The method of claim 35, wherein the apparent specific gravity of the ULW proppant is less than or equal to 1.75.

37. The method of claim 36, wherein the apparent specific gravity of the ULW proppant is less than or equal to 1.25.

38. The method of claim 34, wherein the ULW proppant comprises a core component at least partially surrounded by a protective or hardening coating.

39. The method of claim 34, wherein the formation is a hydrocarbon-bearing formation.

40. The method of claim 39, wherein the hydrocarbon-bearing formation is a coal bed.

41. The method of claim 39, wherein the hydrocarbon-bearing formation is a carbonate formation, sandstone or a siliceous substrate mineral.

42. The method of claim 34, wherein the proppant in the fracturing fluid is a ULW proppant.

* * * * *